(No Model.)

J. H. REED.
DENTAL MATRIX.

No. 376,548.  Patented Jan. 17, 1888.

WITNESSES:
J. D. Garfield
C. Sedgwick

INVENTOR:
J. H. Reed
BY Munn & Co.
ATTORNEYS.

UNITED STATES PATENT OFFICE.

JOHN H. REED, OF LANCASTER, WISCONSIN, ASSIGNOR OF ONE-HALF TO C. STODDARD SMITH, OF CHICAGO, ILLINOIS.

DENTAL MATRIX.

SPECIFICATION forming part of Letters Patent No. 376,548, dated January 17, 1888.

Application filed March 25, 1887. Serial No. 232,391. (No model.)

*To all whom it may concern:*

Be it known that I, JOHN H. REED, of Lancaster, in the county of Grant and State of Wisconsin, have invented a new and Improved Dental Matrix, of which the following is a specification, reference being had to the annexed drawings, forming a part thereof, in which—

Figure 1:
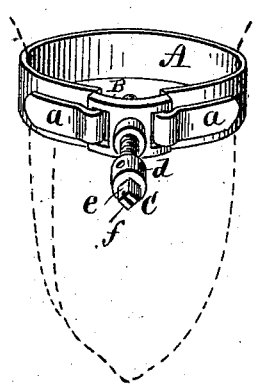
Figure 2:
Figure 3:
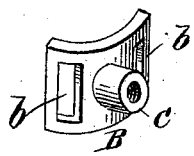
Figure 4:

Figure 1 is a perspective view of my improved dental matrix. Fig. 2 is a side elevation of the band for surrounding the tooth. Fig. 3 is a perspective view of the yoke for receiving the ends of the band; and Fig. 4 is a plan view of a tooth, showing the application of my improved matrix.

Similar letters of reference indicate corresponding parts in all the views.

The object of my invention is to provide a simple and effective device for supporting the filling while being inserted into a cavity in a tooth, the device supplying the place of one or more of the natural walls of the tooth-cavity.

My invention consists in a band of brass, German silver, nickel, spring-steel, or a combination of any such metals, a yoke for receiving the ends of the band, and a screw passing through the yoke and engaging the side of the tooth, so as to tighten the band, all as hereinafter more fully described.

The band A is provided with tongues $a$ at opposite ends for insertion in the oblong apertures $b$, formed in the ends of the yoke B. The yoke B is made of steel or other hard metal, and is provided with a central boss, $c$, which is apertured and threaded to receive the clamping-screw C. The clamping-screw C is preferably provided with a turret-head, $d$, having transverse holes formed in it, a square head, $e$, for receiving a key, and a nick, $f$, for receiving an ordinary screw-driver.

The matrix is applied to the tooth by bending the band A so as to approximately fit the outer surface of the tooth and to supply any deficiencies in the cavity-walls. The band is tightened upon the tooth by turning the screw C, thereby drawing the ends of the band outward and bringing its middle portion firmly into contact with the side of the tooth. After the filling has been completed the screw C is loosened and the band A is removed from the tooth, when the filling can be finished in the usual way.

My improvement is applicable also in the regulation of teeth. The bands A may be placed around any tooth which it is desired to move or use as an anchor, and the screw C may be brought to bear against the side of another tooth, thus enabling the operator to change the position of the teeth.

Bands A of different length, width, and thickness, and also of different metals, will be required to adapt the matrix to teeth of different sizes and conditions. Therefore I do not limit or confine myself to any particular dimensions or proportions, or to any particular material; but the band must be of a softer or more flexible metal than that of which the yoke B is composed.

Having thus fully described my invention, I claim as new and desire to secure by Letters Patent—

A dental matrix consisting of a hard-metal yoke provided with a screw, and a band formed of a softer metal than that of which the yoke is formed, to be attached to the yoke by tongues on the end thereof, passing through apertures formed in the yoke.

JOHN H. REED.

Witnesses:
EVA GARDINER,
CORA A. ORMSBEE.